Dec. 11, 1956  J. W. THOMAS  2,773,476
CATTLE GATE AND CHUTE
Filed Aug. 14, 1953  3 Sheets-Sheet 3
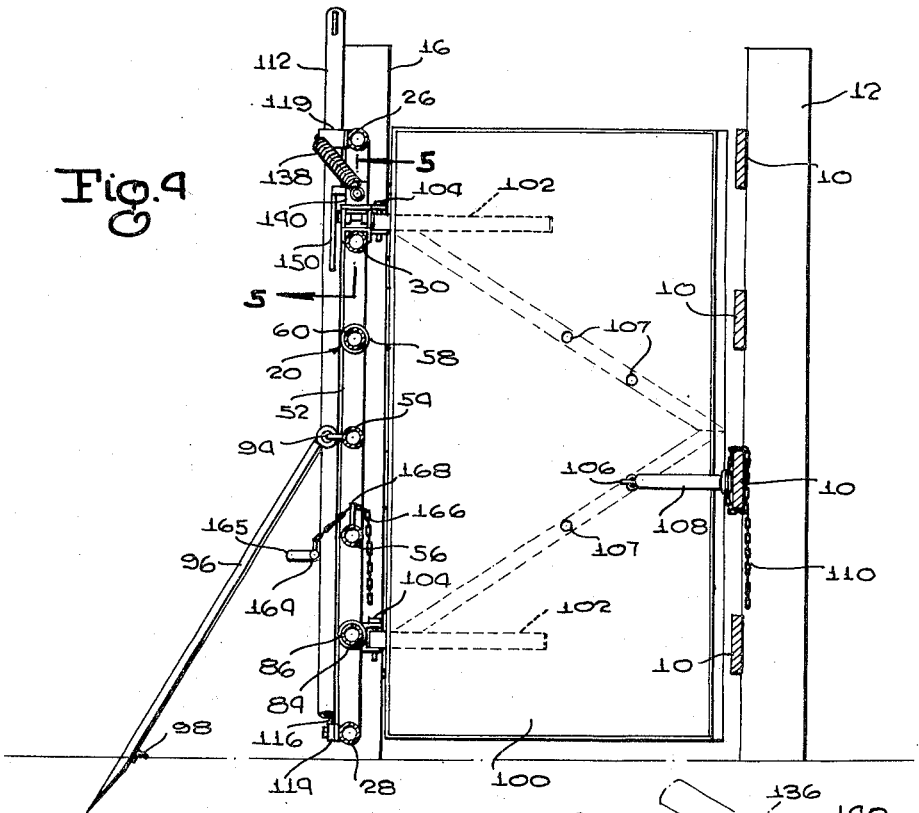
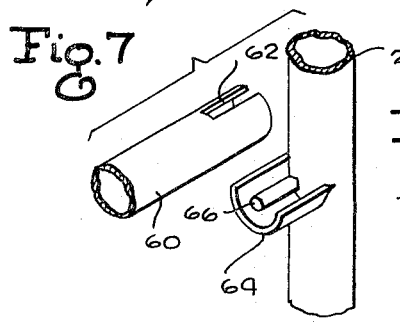
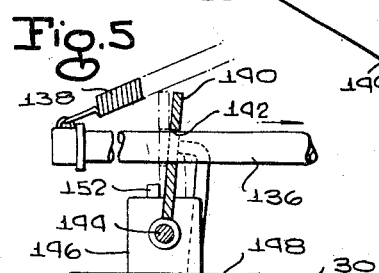
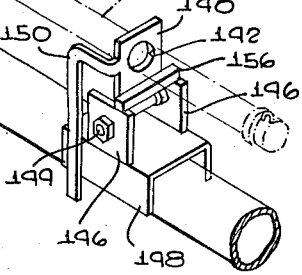
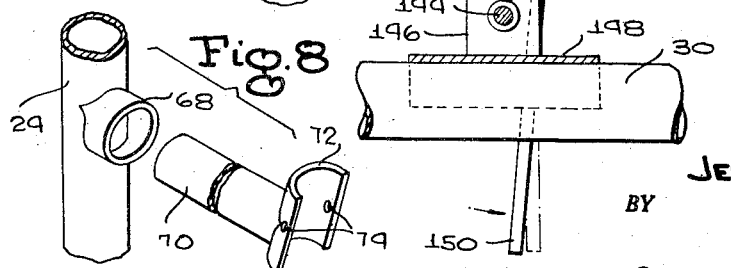
INVENTOR.
JESS W. THOMAS
BY
McMorrow, Berman & Davidson
ATTORNEYS United States Patent Office 2,773,476
Patented Dec. 11, 1956

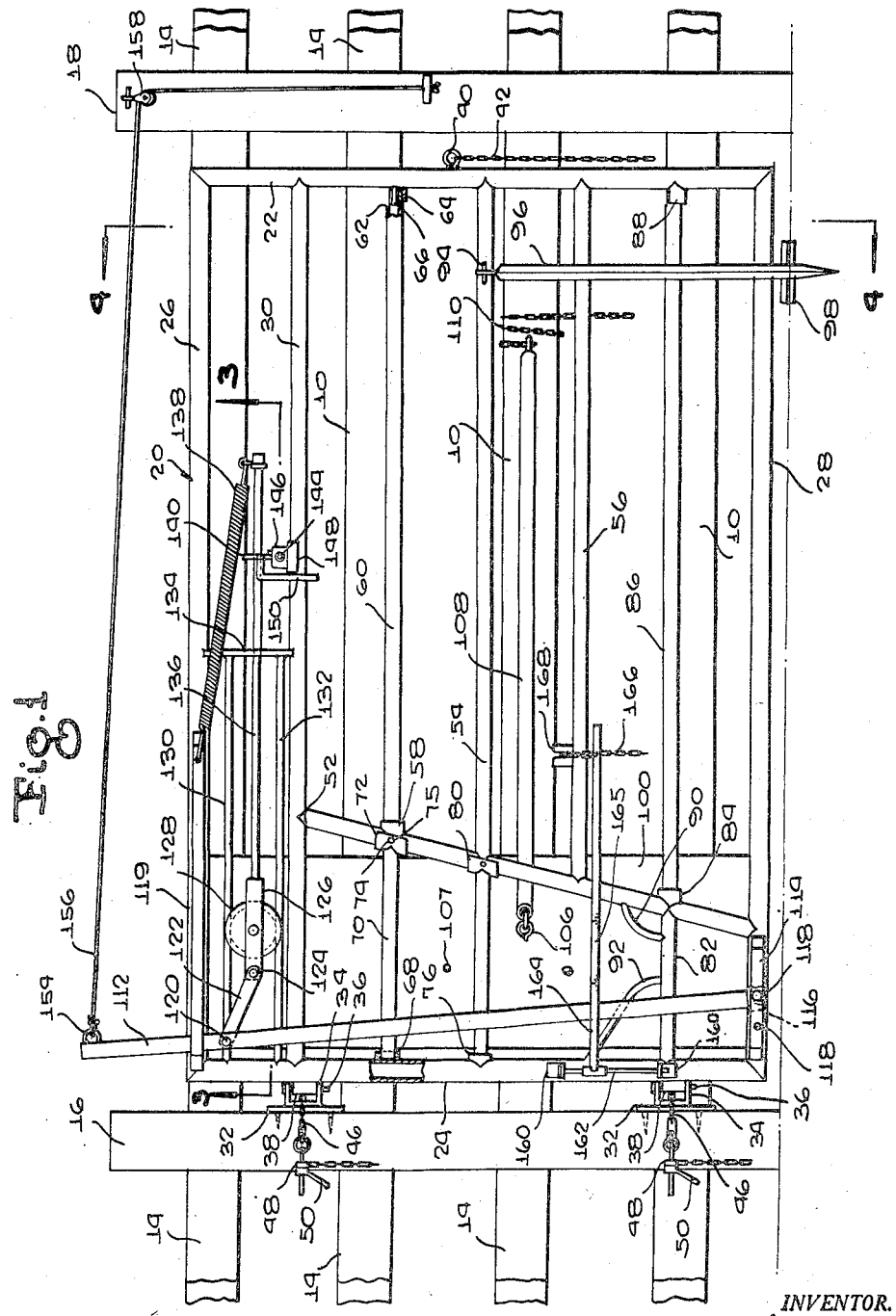

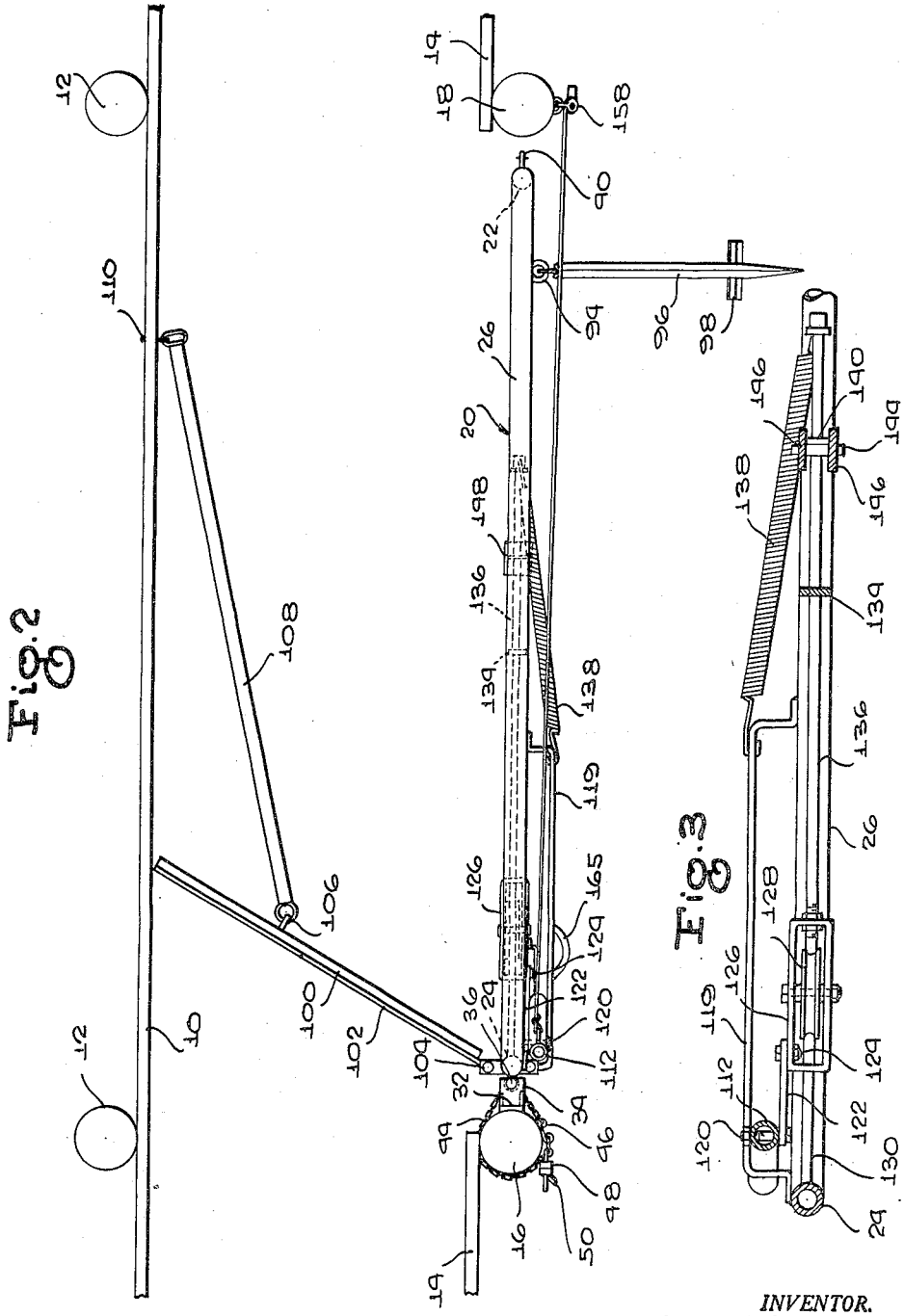

2,773,476

CATTLE GATE AND CHUTE

Jess W. Thomas, Decker, Mont.

Application August 14, 1953, Serial No. 374,169

3 Claims. (Cl. 119—99)

The present invention relates to an improved cattle gate, of the type used, for example, in a chute extending from a crowding pen.

Gates of the type stated are not new per se, of course. Nevertheless, it has been well appreciated in the field to which the invention relates that considerable room for improvement in such gates exists.

Desirably, a gate of the nature referred to should be so designed as to efficiently confine the cattle, to prevent undue movement of the cattle when dehorning, branding, milking, and other operations are being performed thereupon. This should be true of a cattle gate regardless of the size of the cattle, the size and shape of the horns thereof, and the head shape.

Heretofore, to my knowledge, there has not been devised a cattle gate which is so designed as to meet all the above requirements, and the main object of the present invention is to provide a generally improved gate which does meet the needs that have been felt.

A more specific object of the invention is to provide a cattle gate as described which will be swiftly and easily prepared for use on cattle of particular sizes and head shapes, on which a particular operation is to be performed.

Another object is to provide a cattle gate as stated which will be so designed as to be readily usable for sorting or separating cattle. It is customary to separate the steers from the heifers at the time the cattle are to be sold, and the gate constituting the present invention lends itself readily to use in making the necessary separation. Heretofore, it has been customary, on the part of many cattle men, to separate the cattle by cutting individual cattle out of a corral, one at a time.

Still another object is to provide a cattle gate as stated so designed as to permit individual bars thereof to be removable, to expose different panels, according to the operation to be performed. For example, removal of one bar of the gate exposing a branding panel, while removal of another bar exposes a milking panel. Other bars are removable for dehorning purposes, and for accommodating round headed cattle.

Yet another object is to provide a cattle gate as stated which will be particularly designed to make effective use of the cattle's own tendencies when forced into a chute. Cattle are reluctant to move through a chute, and tend to attempt escape by putting their heads through side openings therein. The cattle gate constituting the present invention makes use of this tendency, and permits the formation of openings in the gate for receiving the heads of cattle, thereby to further aid in confining the cattle in a manner that will prevent the cattle from moving about while being branded, inoculated, milked, etc.

Yet another object is to provide a device as described which will be so designed as to prevent the cattle from using their hind feet, it being well known that heretofore, cattle tend to force themselves upwardly with their hind feet when confined in a chute. The cattle gate constituting the present invention is so designed as to hamper the cattle in movements that would ordinarily be permitted were their hind feet left free.

Other objects will appear from the following description, the claims appended thereto, and from the annexed drawings, in which like reference characters designate like parts throughout the several views, and wherein:

Figure 1 is a front elevational view of a cattle gate formed in accordance with the present invention;

Figure 2 is a top plan view, chute on which the gate is mounted being shown fragmentarily;

Figure 3 is an enlarged sectional view on line 3—3 of Figure 1, showing a clamping bar guide and lock means;

Figure 4 is a sectional view on line 4—4 of Figure 1;

Figure 5 is an enlarged, detail sectional view taken substantially on line 5—5 of Figure 4, showing the locking means for the clamp bar;

Figure 6 is a fragmentary perspective view of said locking means, a guide rod being illustrated in dotted outline;

Figure 7 is a fragmentary, exploded perspective view showing the connection of one of the removable bars to an end post of the stanchion; and Figure 8 is a fragmentary, exploded perspective view showing a removable bar normally covering the head panel.

A cattle gate such as constitutes the present invention is used in a chute extending from a crowding pen, not shown, said chute ordinarily being little greater than the width of a large animal, with the gate being mounted in an open space formed in one of the side walls of the chute. Referring to Figure 2, and also to Figure 4, the illustrated chute is basically conventional, and includes a plurality of vertically spaced, horizontally extending side rails 10 secured to upstanding posts 12 to form the back wall of the chute. The front wall of the chute is defined by horizontally extended rails 14 secured to upstanding gate posts 16, 18. The posts are spaced apart a distance sufficient to accommodate the cattle gate 20 therebetween.

The cattle gate is formed basically of pipe stock, and is of rectangular outer configuration as shown in Figure 1, the gate being provided with a vertically disposed outer end post 22 and a vertical inner end post 24. Welded at its opposite ends to and extending between the upper ends of the posts 22, 24 is a top bar 26. A horizontal bottom bar 28 is fixedly secured at its opposite ends to and extends between the lower ends of the end bars 22, 24. The top and bottom bars cooperate with the end bars in defining a vertically disposed, rectangular, open framework in the gate.

To reinforce the gate adjacent the top bar 26, I provide a horizontally disposed brace bar 30 which, as shown in Figure 1, extends between and is fixedly secured to the upper end portions of the bars 22, 24, in closely spaced relation to the top bar.

The gate 20 is hinged upon post 16 for horizontal swinging movement between its normally closed position shown in Figure 2 and an open position, not shown, in which the gate is swung in a direction away from the chute through approximately 120 degrees from its closed position. To hingedly mount the gate for swinging movement between these positions, vertically spaced hinge plates 32, flat and rectangular in form, are secured fixedly to the gate post 16. Welded to the respective plates 32 are C-shaped hinge brackets 34, and extending between the arms of the hinge brackets are vertically disposed hinge pins 36 extending through hinge sleeves 38 fixedly secured to and spaced vertically of the inner end bar 24 of the gate.

Means is incorporated in the construction to connect the free end of the gate to the gate post 18, when the gate is closed and is not to be opened. To this end, an eye 40 secured to the mid-length portion of end bar 22 has a chain 42 passed therethrough, said chain being engageable about the gate post 18 to hold the gate in closed position.

It is also desirable to insure that the gate hinges will not accidentally be torn away from the post 16, under strains imposed thereupon during use of the device. Accordingly, and as best shown in Figures 1 and 2, chains 44, 46 are attached at one end to the hinge bracket 34 of each hinge. At its other end, chain 46 has a locking plate 48 equipped with a swingable locking arm 50. The free end of chain 44, which is considerably longer than chain 46 (Figure 2) can be passed through the lock plate 48, and held tightly about the post 16 by swinging of the arm 50 to its locking position.

It is desirable that the cattle gate be divided into areas within which various operations can be performed upon the cattle. At one end of the gate, for example, an opening can be provided through which the animal's head can be extended for dehorning, etc., said opening being conventionally termed a head panel in the art to which the invention relates. Further, at the other end of the gate there should be provided vertically spaced panels, one a branding panel and the other a milking panel. The gate constituting the present invention is so designed as to have these various panels incorporated therein, this being a feature of the invention.

To divide the head panel from the branding and milking panels, a dividing bar 52 is provided. Bar 52 is inclined slightly from the vertical as shown in Figure 1, and at its upper end is welded or otherwise fixedly attached to the brace bar 30. At its lower end, bar 52 is fixed to the bottom bar 28. Thus, defined between the dividing bar 52 and the adjacent inner end bar 24 of the gate is a head panel, in which the animal's head can be inserted. The head panel is adjustable as to area in a manner to be made presently apparent.

Welded at its opposite ends to the outer end bar 22 of the gate and the intermediate portion of the inclined dividing bar 52 is a branding panel bottom bar 54. Disposed below the bar 54 and extended in parallelism with the bar is a milking panel top bar 56. This, like the bar 54, is affixed at its opposite ends to the bar 52 and end bar 22 respectively.

A branding panel is defined between the brace bar 30 and the bar 54, and is normally closed by a removable bar extending horizontally within the space between said bars 30, 54. The removable bar is detachably engaged at one end in a horizontally extended socket 58 fixedly secured to the upper end portion of the dividing bar 52, said removable bar being designated by the reference numeral 60. As shown in Figure 7, and also in Figure 1, at its other end the removable bar 60 has a longitudinal slot 62, the slotted end of the removable bar being adapted to seat in a transversely depressed seat 64 fixedly secured to the end bar 22. A locking pin 66 extends horizontally from the bar 22 above the seat 64, and it will be seen that on rotation of the removable bar 60 through one-hundred eighty degrees from the position thereof shown in Figure 7, the slot 62 will be disposed to receive the pin 66. This will allow the removable bar 60 to seat in the transversely depressed member 64. After the bar 60 has been seated in this manner, it can be partially rotated to misalign the slot 62 relative to pin 66. As a result, the bar 60 will be securely locked at its opposite ends in the socket 58 and seat 64 respectively, when the branding panel is not to be used.

The head panel is also normally closed by removable bars, and to provide a mounting for the removable head panel bars, sockets are rigidly secured to the inner end bar 24 of the gate. One of the sockets has been designated by the reference numeral 68 (Figure 1), and removably engaged therein is one end of a relatively short, removable, head panel bar 70 extending to the dividing bar 52. At the dividing bar 52, the head panel bar 70 is provided with an inclined saddle 72 straddling the bar 52 and formed with transversely aligned openings 74 (see Figure 8). The openings 74 are adapted to receive a cross pin 75, that extends through a transverse opening formed in the dividing bar 52. It will be seen that by removal of the pin 75, the bar 70 can be swung upwardly, thereby permitting said bar to be removed from the socket 68. It will be understood that the size of the socket 68 is such as to permit the bar 70 to be swung in the manner referred to, to such an extent as is necessary in removing or inserting the bar 70.

Also rigid with the bar 24 is a socket 76, disposed below the socket 68, and removably engaged in the socket 76 is one end of a second head panel bar 78. At its other end, bar 78 is rigid with a saddle 80 straddling dividing bar 52 and pinned to the dividing bar in the same manner as saddle 72.

Either or both of the bars 70, 78 can be removed as desired, depending on whether large or small animals are being handled, and depending, further, on the head shapes of the animals and the size of their horns.

At the lower end of the head panel, a short, horizontal brace bar 82 is made rigid at its opposite ends with the lower end portions of bars 24, 52. Coaxial with bar 82 is a socket 84 receiving one end of the removable bar 86, the other end of which is removably engaged in a seat 88 formed like the seat 64. Bar 86, when removed, exposes a milking panel, which can be used for any purpose found suitable.

To prevent choking of the animal, curved, upwardly diverging bars 90, 92 are rigidly secured at their lower ends to the bar 82, and at their upper ends to the bars 52, 24 respectively, the divergent members being disposed at the lower end of the head panel.

To hold the gate from swinging outwardly from selected positions to which it is adjusted on its hinges, an eye 94 is secured to bar 54, adjacent the outer end bar 22. Loosely pivoted on eye 94 is the upper end of an anchoring rod 96, the lower end of which is pointed to penetrate the ground. Adjacent its lower end, the rod 96 has a short cross bar 98 rigidly secured thereto, the cross bar limiting penetration of the soil by the pointed end of the anchoring rod.

An auxiliary gate or movable partition has been designated by the reference numeral 100, and extends transversely across the chute. The gate 100 is hinged upon the gate 20, and is provided with vertically spaced strap hinges 102 receiving hinge pins 104 carried by the inner end bar 24 of the main gate.

The auxiliary gate 100 can be used in cooperation with the main gate in forming the chute to a selected width, at the location of the main gate. In other words, it is desired that the chute be as narrow as possible for small animals, and wider for larger animals. In either instance, the animals should be confined as closely as possible within the chute, to prevent undesired movement thereof.

Accordingly, the gate 100 is provided with an eye 106, to which is loosely and pivotally connected one end of a stabilizing or holding bar 108, the other end of which is equipped with a chain 110 that can be engaged about a selected rail 10 of the chute.

As shown in Figure 4, the auxiliary gate has a plurality of openings 107, irregularly spaced vertically and horizontally of the auxiliary gate. The eye 106 can be engaged in any of the openings 107, to locate the stabilizing bar 108 wherever desired, depending upon the particular size of the animal being handled, and the width of the chute desired.

The animals will, of course, halt at the location of the auxiliary gate, and the stabilizing bar 108 will confine the animals to an area in which they will be readily accessible through the main gate. The stabilizing bar 108, in this regard, is so designed as to interfere with the free movement of the hind legs of the animal, and as a result, the animal will be held substantially against undesired movement, and will be forced against the main gate, for exposure of selected panels.

If desired, the auxiliary gate can be swung inwardly against the main gate, thereby to permit the animals to move freely through the chute. Further, the main gate can be swung outwardly to an open position while the auxiliary gate remains in a closed position, thus to cause the animals to be diverted out of the chute through the space between the posts 16, 18. This arrangement is particularly valuable when the separation of animals is being effected, and it is merely necessary that the animals be caused to move, one at a time, through the chute, with the gates being manipulated as necessary to cause certain of the animals to proceed through the open main gate, while other animals are allowed to pass the auxiliary gate.

It is a part of the invention that clamp means is embodied in the main gate construction, adapted to hold the animal's head against movement, when the head is extended through the open head panel. To this end, an elongated clamp bar 112 has its lower end engaged in the space between the bottom bar 28 and a horizontally extending support bracket 114. On the lower end of the clamp bar there is provided a plate 116 upwardly notched to receive any of a plurality of pins 118 extending between bracket 114 and bar 28. In this way, the clamp bar is swingable through a vertical plane upon a selected pivot pin 118.

The upper end portion of the clamp bar 112 is guided during the vertical swinging movement of the same by means of an elongated, horizontally extending guide bracket 119 secured to the top bar 26 of the main gate.

Pivotally connected at 120 to the upper end portion of the clamp bar 112 is a link 122, said link being pivotally connected at 124 to a horizontally disposed, rectangular pulley housing 126, in which is journaled a pulley 128. Pulley 128 is rollable between tracks 132 extending horizontally in the space between the top bar 26 and the bar 30 of the main gate. The track members 130 are fixedly secured at one end to the inner end bar 24 of the main gate, and at their other ends are fixedly secured to a vertically disposed plate 134 extending between and rigid with the bars 26, 30.

A guide plunger 136 is fixedly connected at one end to the pulley housing 126, and intermediate its ends is slidable in an opening provided in the plate 134. The other end of the plunger 136 is connected to a pullback spring 138, said spring 138 being attached to a stationary part of the device, such as the guide bracket 119.

The spring 138 is so tensioned as to normally urge the guide pulley 128 and clamp bar 112 to the left in Figure 1, to its normal, inoperative position shown in said figure.

Means is embodied in the device for normally preventing the spring 138 from returning the clamp bar and pulley to their inoperative position, when the clamp bar has been swung to the right against the head of an animal, to confine the animal's head between the clamp bar and dividing bar 52. The means for releasably locking the clamp bar in its operative position has been shown to advantage in Figures 5 and 6, and as shown in these figures of the drawing, includes a substantially vertically disposed locking plate 140 having a center opening 142 through which the plunger 136 extends, the opening 142 being slightly greater in diameter than the plunger 136 as shown in Figure 5.

At its lower end the lock plate 140 is pivoted upon a horizontally disposed pivot or hinge pin 144 extending between upstanding bracket plates 146 secured fixedly to a saddle 148 straddling and fixed to the bar 30.

A release handle 150 of inverted L-shape is rigid at its upper end with one side of the lock plate 140. In use of the locking device, it will be noted that a stop bar 152 normally prevents the locking device from moving beyond the dotted line position shown in Figure 5, in a counterclockwise direction. As a result, the plunger 136 is always free to move to the right in Figure 1. When the plunger 136 has been moved to the right to a selected extent, the spring 138 will begin to assert its contractile tendencies, to return the plunger to its left-hand position. This will cause the plate 140 to rock to the full line position shown in Figure 5, as a result of which the diametrically opposite portions of the edge of opening 142 will bind against the plunger 136, to prevent the plunger from beginning its return movement. The clamp bar 112 will thus be held in engagement with the animal's head, to keep the head from moving while various operations are being performed thereupon.

At such time as it is desired to permit return movement of the plunger 136, one need only strike the release handle 150, to shift the lock plate 140 to the dotted line position shown in Figure 5. This allows free movement of the plunger 136 to its normal, rest position.

Means is embodied in the device for permitting the clamp bar 112 to be swung to the right in Figure 1, from a location remote from the clamp bar. This means includes an eye 154 secured to the upper end of the bar 112, a flexible element 156 being connected to said eye. The flexible element is trained, intermediate its ends, about a pulley 158 pivotally suspended from the upper end of post 18, the flexible element depending along said post 18 and being provided with a handle at its lower or free end. It will be seen that the element can be pulled for the purpose of swinging the clamp bar 112 in the direction of the dividing bar 52, to engage the animal's head between the clamp bar and dividing bar.

The invention also includes a dehorning nose band, and as shown in Figure 1, a vertically disposed, elongated hinge pin 162 is engaged at its opposite ends in vertically aligned hinge brackets 160 secured to the inner end bar 24. Slidable longitudinally of the pin 162, and freely rotatable upon said pin, is a sleeve rigid with an elongated rod 164 formed intermediate its ends with an outwardly bowed dehorning nose band 165. At its free end, the rod 164 can be held against the main gate by means of a chain 166 (Figure 4), said chain being secured at one end to the rod 164 and being adapted for engagement in an upstanding bracket 168 secured fixedly to the bar 56 of the main gate. Bracket 168 is notched to receive a selected link of the chain, thus to cause the rod 164 to be held against outward swinging movement beyond a predetermined position.

It will be seen that the rod 164 can be vertically adjusted upon the pin 162, according to the size of the particular animal, after which the rod 164 can be horizontally swung inwardly to engage the nose band 165 over the nose of the animal, thereby to further aid in holding the animal's head in place during dehorning thereof.

The cattle gate constituting the present invention can be used in a variety of ways, all of which will be readily apparent to those skilled in the art. It is important to note, in this regard, that the gate is so designed as to assist in separation of animals, said separation being readily achieved by swift and easy manipulation of the main and auxiliary gates, in the manner discussed hereinbefore. Further, the construction is adapted to permit milking, inoculation, branding, and dehorning of animals with a minimum of trouble, the main gate being so designed as to permit various panels to be exposed, depending upon the operation to be performed. Still further, when the head panel is being used, a clamp bar 112 is readily swingable into place, to hold the animal's head against movement, and will be releasably locked in head-engaging position by the lock means shown in Figures 5 and 6.

It is also to be noted that the gate is so designed as to confine animals against substantial movement, thereby to render easier the task being performed thereupon. The auxiliary gate can be used, as previously noted herein, to reduce the overall space within which the animal is to be confined, and the stabilizing bar 108 associated with the auxiliary gate can be adjustably positioned according to the size of the animal, to prevent movement of the animal's legs in a manner that would normally tend to prevent holding of the animals in the desired space.

It is also believed to be of importance to note that the gate is so designed as to make use of the animal's own tendencies, in holding the animal against movement. In other words, the stabilizing bar 108 prevents movement of the animal's legs, at that side of the animal opposite the main gate. This crowds the animal toward the main gate, and by exposure of a selected panel the necessary operation can be performed upon the animal. The head panel, being located directly in the main gate, is so located as to cause the animal to naturally tend to extend its head therethrough, when the animal is forced toward the main gate by the stabilizing bar 108.

Still further, the main gate can be swung to any of various open positions, and will be held in said open positions by the anchoring means 96, 98.

The various openings 107 provided in the auxiliary gate are further adapted to adapt the device for either left or right hand opening, as desired. In other words, the auxiliary gate can, in effect, be inverted, when the direction of opening is to be changed, and different openings 107 can be used to keep the stabilizing bar 108 at a selected, horizontal level.

It is also thought to be important to note that the removal of the various bars, to expose different panels, can be carried out selectively, and in many instances it might be desired to remove all the bars, to permit different operations to be carried out successively. This of course depends upon the desires of the particular user, and no attempt is made to prescribe herein the particular bars that should necessarily be removed for particular operations.

It is also believed worthy of note that the auxiliary gate, though illustrated in the drawings as being hinged upon the inner end bar of the main gate, could instead be hinged upon the back wall of the chute. The auxiliary gate would still be positioned substantially as shown in the drawings, but the free edge of the auxiliary gate would be disposed where the hinged edge is now shown.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. The combination, with a chute including laterally spaced, parallel, vertical, back and front walls, the front wall including vertical gate posts spaced longitudinally of the front wall, of: a main gate of a width approximately equal to the horizontal distance between the gate posts, said main gate being hingedly connected at one side thereof to one of the posts, the hinge axis of the main gate being vertical, the main gate swinging on said axis between closed and open positions, the gate when in closed position being in alignment with the front wall and extending across the space between the posts, the gate when in its open position extending at an angle to said front wall exteriorly of the space between the walls; and a vertical auxiliary gate hingedly connected at one side thereof to the main gate, the hinge axis of the auxiliary gate extending in closely spaced parallel relation to the hinge axis of the main gate, the auxiliary gate being of a width at least substantially equal to the distance between said walls, said auxiliary gate being swingable on the main gate, in each of said positions of the main gate, between closed and open positions, the auxiliary gate in its closed position extending across the chute from one to the other wall and in its open position being disposed against the main gate.

2. The combination, with a chute including laterally spaced, parallel, vertical, back and front walls, the front wall including vertical gate posts spaced longitudinally of the front wall, of: a main gate of a width approximately equal to the horizontal distance between the gate posts, said main gate being hingedly connected at one side thereof to one of the posts, the hinge axis of the main gate being vertical, the main gate swinging on said axis between closed and open positions, the gate when in closed position being in alignment with the front wall and extending across the space between the posts, the gate when in its open position extending at an angle to said front wall exteriorly of the space between the walls; a vertical auxiliary gate hingedly connected at one side thereof to the main gate, the hinge axis of the auxiliary gate extending in closely spaced parallel relation to the hinge axis of the main gate, the auxiliary gate being of a width at least substantially equal to the distance between said walls, said auxiliary gate being swingable on the main gate, in each of said positions of the main gate, between closed and open positions, the auxiliary gate in its closed position extending across the chute from one to the other wall and in its open position being disposed against the main gate; and an elongated stabilizing bar detachably, pivotally connected at one end to the back wall at a location spaced longitudinally of the chute from the auxiliary gate, and having a detachable, pivotal connection at its other end to the auxiliary gate spaced from the hinge axis of the auxiliary gate.

3. The combination, with a chute including laterally spaced, parallel, vertical, back and front walls, the front wall including vertical gate posts spaced longitudinally of the front wall, of: a main gate of a width approximately equal to the horizontal distance between the gate posts, said main gate being hingedly connected at one side thereof to one of the posts, the hinge axis of the main gate being vertical, the main gate swinging on said axis between closed and open positions, the gate when in closed position being in alignment with the front wall and extending across the space between the posts, the gate when in its open position extending at an angle to said front wall exteriorly of the space between the walls; a vertical auxiliary gate hingedly connected at one side thereof to the main gate, the hinge axis of the auxiliary gate extending in closely spaced parallel relation to the hinge axis of the main gate, the auxiliary gate being of a width at least substantially equal to the distance between said walls, said auxiliary gate being swingable on the main gate, in each of said positions of the main gate, between closed and open positions, the auxiliary gate in its closed position extending across the chute from one to the other wall and in its open position being disposed against the main gate; and an elongated stabilizing bar detachably pivotally connected at one end to the back wall at a location spaced longitudinally of the chute from the auxiliary gate, and having a detachable, pivotal connection at its other end to the auxiliary gate spaced from the hinge axis of the auxiliary gate, said last named connection being mounted on the auxiliary gate for adjustment to selected locations spaced vertically of the auxiliary gate.

References Cited in the file of this patent

UNITED STATES PATENTS

| | | |
|---|---|---|
| 1,542,151 | Lehtonen | June 16, 1925 |
| 1,754,752 | Grim | Apr. 15, 1930 |

(Other references on following page)

UNITED STATES PATENTS

| | | |
|---|---|---|
| 1,863,603 | Marshall | June 21, 1932 |
| 2,050,527 | Grabe | Aug. 11, 1936 |
| 2,084,255 | Johnson | June 15, 1937 |
| 2,136,008 | Gregory | Nov. 8, 1938 |
| 2,214,969 | McNett | Sept. 17, 1940 |
| 2,504,214 | Miller et al. | Apr. 18, 1950 |
| 2,554,558 | Bush | May 29, 1951 |
| 2,587,318 | Hively | Feb. 26, 1952 |

FOREIGN PATENTS

| | | |
|---|---|---|
| 602,900 | France | Jan. 4, 1926 |